3,362,982
PURIFICATION OF POLYCYANOBENZENES
Taijiro Oga, Hideo Ichinokawa, Michitoshi Kitabatake, and Masatomo Ito, Tokyo, Japan, assignors to Showa Denko Kabushiki Kaisha, Tokyo, Japan, a corporation of Japan
No Drawing. Filed Feb. 8, 1965, Ser. No. 431,155
Claims priority, application Japan, Feb. 17, 1964, 39/8,152
5 Claims. (Cl. 260—465)

ABSTRACT OF THE DISCLOSURE

A process for purifying crude polycyanobenzenes by subjecting a mixture of said crude polycyanobenzene and alkylene glycol, said glycol containing from 4–9 carbon atoms and from 0–3 etheric oxygen atoms, the two hydroxyl groups of said glycol being separated by a chain consisting of at least 5 atoms, to azeotropic distillation with subsequent cooling of the distillate to separate in solid form the desired polycyanobenzene with subsequent recovery of the same.

---

The invention relates to a process for purifying polycyanobenzenes which is characterized in that crude polycyanobenzenes are subjected to azeotropic distillation in the presence of aliphatic glycols.

Polycyanobenzenes are produced by various processes from xylenes, pseudocumene, phthalic acids, trimellitic acid, etc., but in all cases they contain undesirable impurities. Thus, when it is intended to use them as starting materials of polyamides and polyesters after having converted them to polyamines or polycarboxylic acids, they are unsuitable. In particular, when they are to be used, for instance, directly as the starting material for the production of terephthalic acid for polymerization use, they require purification, since a considerably high purity is demanded.

As processes for purifying polycyanobenzenes heretofore, known are such as a process which comprises mixing the crude product with water and thereafter, while heating the mixture, blowing in an inert gas such as steam or nitrogen to drive off the impurities, or a process which comprises washing out the impurities by means of water, alcohols, fatty acids, mineral acids or by means of other solvents. Alternatively, there is also the recrystallization process. These processes however were attended with many problems from the standpoint of product quality and economics in that they had one or more of the defects such as that high purity products could not be obtained because the degree of purification attained was not sufficient, the yield was low because of high purification losses, or the operations involved were complicated.

As a result of having engaged in researches for overcoming all of these defects of the prior art processes and providing a commercially advantageous and effective process for producing with simple operations and equipment polycyanobenzenes in such high purity as to be suitable for the production of high quality polyamides and polyesters therefrom, we found that this objective could be easily achieved by the azeotropic distillation of the foregoing polycyanobenzenes with aliphatic glycols—a process differing essentially from the aforementioned various prior art processes.

Generally speaking, while it is not entirely unknown commercially to effect the purification by distillation of compounds which are solid at room temperature, it is very seldom practiced. The purification of polycyanobenzene is not an exception and heretofore it has not been a practice to purify them by distillation. This is believed to be for the following reason. The melting points of, for example, dicyanobenzenes are 140°, 161° and 224° C. for their ortho, meta and para isomers, respectively, while their boiling points all exceed 270° C. Foreseeing the various difficulties and disadvantages that naturally would be involved commercially when it is attempted to purify the polycyanobenzenes of such essentially high melting and boiling points, using the distillation technique, it is presumed that it was not readily conceivable as to the possibility of carrying out this operation smoothly by means of distillation. Particularly, the clogging of the distillation system owing to the solidification of the material treated and the inconvenience in handling the distillate are difficulties which can be readily imagined.

We continued our researches to discover finally the various following facts upon which basis the present invention has been achieved.

Namely, as a result of vapor pressure measurements of polycyanobenzenes and investigations regarding the numerous substances to be combined therewith for effecting the azeotropic distillation, we found that the polycyanobenzenes could form an azeotropic mixture with the aliphatic glycols and further that this was the minimum azeotropic mixture. It was also found that there was a considerable difference in the solubility of the polycyanobenzenes with respect to said aliphatic glycols at low and high temperatures, and thus that when the azeotropic mixture was cooled, the polycyanobenzene in high purity could be readily crystallized out in powdered form. In contrast with the fact that the usual azeotropic mixtures cannot be separated into their components in the liquid-liquid mixture, in the case of the azeotropic mixture according to the present process, the separation of the components is easily accomplished, since it is a liquid-liquid mixture. In addition, the intended polycyanobenzene, after being subjected to azeotropic distillation, also receives, at the same time it is being crystallized out by cooling, the effects of recrystallization by means of the aliphatic glycol, the constituent of the azeotropic mixture.

Further, it was found that in concomitance with such facts as that the aliphatic glycols used herein are materials having the characteristic that the range in which they can exist as a liquid is very broad; that since the azeotropic mixture formed is the minimum azeotropic mixture, it was possible to ensure that the polycyanobenzene, the solidified component, would not remain in the bottom of the distillation tower; and that when the azeotropic mixture is cooled, the mixture of the aliphatic glycol and the crystallized polycyanobenzene forms a slurry, the treatment could be carried out completely as a fluid system with no possibility at all of the occurrence of clogging in any part of the distillation apparatus, thereby accomplishing the purification operation exceedingly smoothly and hence that it was also possible to carry out the process by continuous operation.

For sake of simplicity, the present invention will be fully described below, taking, as a typical example, the instance of paradicyanobenzene. Paradicyanobenzene is a solid having a high melting point of 224° C. whose distillation is quite difficult. However, when researches were made with respect to its vapor pressure, it was found that when this was vacuum distilled in the presence together of an aliphatic glycol such as, say, diethylene glycol, it could be readily distilled as an azeotropic mixture. Moreover, by cooling the distillate after completion of the azeotropic distillation, a major part of the paradicyanobenzene could be deposited as pure white crystals from the aforesaid glycol and thereafter readily separated therefrom by such simple operations as filtration.

Further, while the crude paradicyanobenzene that is obtained, for example, by catalytically reacting over a suitable catalyst, such as the vanadium compounds, a mixed gas containing paraxylene, ammonia and oxygen contain a number of impurities, these impurities, e.g., water, ammonium carbonate, paratolunitrile, paracyanobenzoic acid, terephthalic acid and acid amide thereof, and also the ortho- and metadicyanobenzenes, phthalimide and benzonitrile which derive from the ortho- and metaxylenes and ethyl benzene which were present originally as impurities in the starting material paraxylene can be completely eliminated by the present invention. While the reaction of paraxylene has been set forth above to illustrate the preparation of a paradicyanobenzene it is obvious that other methyl substituted benzenes, i.e. benzenes containing 2 or 3 methyl groups, can be suitably used in the production of other crude di- and tricyanobenzenes.

The coloring substances which cause trouble particularly in the starting materials of synthetic fibers can also be readily separated as high boiling substances in accordance with the invention process and pure white dicyanobenzenes can be obtained. In consequence, when terephthalic acid is to be produced by subjecting the paradicyanobenzene obtained by this invention to hydrolysis, the process yields terephthalic acid in high purity which can be used for polymerization in its as obtained state without any special purification after the hydrolysis. Further, when this paradicyanobenzene is reacted with ethylene glycol to produce a polyester directly, polymer of good quality can also be obtained as in the case with the use of dimethyl terephthalate.

While the description hereinabove has been made with reference to paradicyanobenzene, the polycyanobenzenes to which the invention process is applicable are the polycyanobenzenes including specifically orthodicyanobenzene, metadicyanobenzene, paradicyanobenzene and 1,3,5-tricyanobenzene, as well as the mixtures thereof. Needless to say, it is possible to separate from a mixture containing a small amount of isomers the predominantly contained polycyanobenzene in high purity, but it is also possible to separate each polycyanobenzene from a mixture containing them. In the case of dicyanobenzene, the separation of the meta and para isomers is possible from a mixture thereof even though the difference in volatility between the two is small. Further, if desired, by adjustment of the operating conditions of the azeotropic distillation, the mixture of meta and para isomers, which are the starting materials, can also be separated from the other impurities and purified, without hardly any change in their mixture ratio.

When strong acids or alkalis are contained as impurities in the crude polycyanobenzenes, they are preferably eliminated or neutralized in advance, as there is a possibility they may set up undesirable side reactions.

The aliphatic glycols used in this invention are those of straight or branched chain which can have ether linkage in their molecules. These glycols contain 4–9 carbon atoms and 0–3 etheric oxygen atoms, and the two hydroxyl groups thereof in the molecule are separated by a chain consisting of at least 5 atoms, i.e., a chain the total of whose carbon atoms or total of whose carbon and etheric oxygen atoms is at least 5. Such glycols are chemically stable under the operating conditions of the azeotropic distillation and are also inert to the polycyanobenzenes. Typical examples of these glycols include diethylene glycol, pentamethylene glycol, triethylene glycol, dipropylene glycol and tripropylene glycol.

Of these glycols, those containing an ether linkage in their molecules, e.g. diethylene glycol, triethylene glycol, dipropylene glycol and tripropylene glycol are particularly suitable in view of such as their chemical stability, high solubility of polycyanobenzenes at elevated temperatures, property of separating polycyanobenzenes at low temperatures, and fluidity.

In actual practice, for facilitating the separation after the completion of the azeotropic distillation, the glycol is chosen in accordance with the class of polycyanobenzene to be purified and operating conditions. One is chosen which is liquid when cold and in which the polycyanobenzene content preferably becomes about 5–80% by weight in the azeotropic mixture. As a specific example, at a pressure of 130 mm. Hg pentamethylene glycol forms with paradicyanobenzene an azeotropic mixture having a boiling point of 186° C. and in which the latter is contained in an amount of 17% by weight.

For avoiding the accumulation of the polycyanobenzene in the bottom of the distillation tower, the mixed charge of the polycyanobenzene and glycol to be subjected to azeotropic distillation is preferably one in which the two components are contained in about an equal ratio to the composition of azeotropic mixture or in which the ratio of the glycol is somewhat in excess.

The glycol separated from the polycyanobenzene after completion of the azeotropic distillation can be reused in its as-separated state or after being subjected to a simple purification process.

Although the azeotropic distillation conditions will vary depending upon the class of polycyanobenzene or class of glycol, in general, it is carried out preferably in the range between 60° and 250° C. A temperature which is too low is not desirable since there is the possibility of solidification of the polycyanobenzenes. On the other hand, if the distillation is carried out at too high a temperature, this also is undesirable as there is a possibility of the attendance of decomposition of the polycyanobenzenes. While the pressure will depend on the operating temperature, generally a range between 10 mm. and 400 mm. Hg is employed.

Several modes of practicing the invention process will be further described by means of the following examples. Unless otherwise noted, all parts and percentages are on a weight basis.

EXAMPLE 1

A mixture of 15.5 parts of crude paradicyanobenzene containing as its chief impurities 1.2% paratolunitrile, 0.5% paracyanobenzoic acid, 0.3% metadicyanobenzene and 0.6% water (obtained by catalytically reacting a mixed gas containing commercial grade paraxylene (purity 99%), ammonia and oxygen, over a vanadium catalyst) and 84.5 parts of diethylene glycol is subjected to vacuum distillation at 186° C. and 129 mm. Hg employing a rectifying tower. After cutting 1.1 parts of the initial fraction, 96.5 parts are distilled. This azeotropic distillation fraction is composed of 15.2% paradicyanobenzene and 84.8% diethylene glycol. The distillate is cooled to 20° C. and the deposited crystals are suction filtered to separate the diethylene glycol, after which they are washed with a small amount of water. By operating in this manner, pure white paradicyanobenzene is obtained at a yield of 94% to the crude paradicyanobenzene. This product did not contain any ortho and meta isomers and paratolunitrile at all, and its coloration as indicated by its Hazen number was below 10.

EXAMPLE 2

A mixture consisting of 32 parts of the crude paradicyanobenzene used in Example 1 and 68 parts of tripropylene glycol is subjected to vacuum distillation at 201.5° C. and 141 mm. Hg, employing a rectifying tower to obtain an azeotropic distillation fraction composed of 32% paradicyanobenzene and 68% tripropylene glycol. By treating this fraction as in Example 1, pure white paradicyanobenzene is obtained at a yield of 94.5%.

EXAMPLE 3

A mixture of 40 parts of crude metadicyanobenzene containing as its chief impurities 1.5% metatolunitrile, 0.3% metacyanobenzoic acid, 1.2% paradicyanobenzene and 0.8% water (obtained by catalytically reacting a mixed gas containing commercial grade metaxylene (purity 95%), ammonia and oxygen, over a vanadium catalyst) and 60 parts of tripropylene glycol is subjected to vacuum distillation at 174.5° C. and 51 mm. Hg, employing a rectifying tower, to obtain an azeotropic distillation fraction composed of 39% metadicyanobenzene and 61% tripropylene glycol. By treating this as in Example 1, pure white metadicyanobenzene is obtained at a yield of 92.3% to the crude metadicyanobenzene. This product did not contain any metatolunitrile of metacyanobenzoic acid at all, and its paradicyanobenzene content was also not more than 0.1%.

EXAMPLE 4

A mixture of 31 parts of crude dicyanobenzene (paradicyanobenzene content 56%, metadicyanobenzene content 39% and remainder impurities) and 170 parts of diethylene glycol is subjected to azeotropic distillation under reduced pressure of 129 mm. Hg at 186° C., employing a rectifying tower. After cutting 1.6 parts of the initial fraction, 115 parts are distilled to obtain an azeotropic distillation fraction composed of 15% dicyanobenzene and 85% diethylene glycol. This is followed by effecting the vacuum distillation at 147° C. and 30 mm. Hg to distill off 63 parts, this azeotropic distillation fraction being composed of 24% dicyanobenzene and 76% diethylene glycol. The distillates obtained are cooled to 20° and 5° C., respectively, the depositing crystals being suction filtered to separate the diethylene glycol, after which they are washed with a small amount of water. By operating in this manner, pure white paradicyanobenzene (metadicyanobenzene content not more than 0.2%) is obtained at a yield of 52% to the crude dicyanobenzene, in the former case, and pure white metadicyanobenzene (paradicyanobenzene content 2.3%) is obtained at a yield of 33.5% to the crude dicyanobenzene, in the latter case.

EXAMPLE 5

A mixture of 22 parts of the paradicyanobenzene used in Example 1 and 124 parts of pentamethylene glycol is subjected to azeotropic distillation under reduced pressure of 130 mm. Hg at 186° C., employing a rectifying tower, to obtain an azeotropic distillation fraction composed of 17% dicyanobenzene and 83% pentamethylene glycol. By treating this as in Example 1, pure white paradicyanobenzene is obtained at a yield of 94%.

What is claimed:

1. In a process for recovering crude polycyanobenzenes selected from di- and tricyanobenzenes including the step of catalytically reacting a mixed gas containing a methyl substituted benzene having from 2 to 3 methyl groups, ammonia and oxygen, to produce a mixture consisting of said crude polycyanobenzene, the improvement which comprises the steps of (1) subjecting the mixture of at least one said crude polycyanobenzene and an alkylene glycol to azeotropic distillation at a temperature of from 60° C. to 250° C., said alkylene glycol containing from 4 to 9 carbon atoms and from 0–3 etheric oxygen atoms, the two hydroxyl groups of said glycol being separated by a chain consisting of at least 5 atoms; (2) cooling the distillate to separate out in solid form the desired polycyanobenzene containing no impurities; and (3) thereafter recovering the same.

2. The process of claim 1 wherein said impurities are selected from water, ammonium carbonate, paratolunitrile, paracyanobenzoic acid, terephthalic acid and the acid amide thereof.

3. The process according to claim 1 wherein said glycol is diethylene glycol.

4. The process according to claim 1 wherein said glycol is tripropylene glycol.

5. The process according to claim 1 wherein said glycol is pentamethylene glycol.

References Cited

UNITED STATES PATENTS

| | | | |
|---|---|---|---|
| 2,846,462 | 8/1958 | Hadley | 260—465 |
| 3,206,378 | 9/1965 | Teramoto et al. | 260—465 X |
| 3,257,446 | 6/1966 | Grice et al. | 260—465.3 |

JOSEPH P. BRUST, *Primary Examiner.*